(12) United States Patent
Heinrich et al.

(10) Patent No.: US 9,923,452 B2
(45) Date of Patent: Mar. 20, 2018

(54) SWITCHED-MODE POWER SUPPLY FOR POWERING A FREQUENCY CONVERTER

(71) Applicant: DR. JOHANNES HEIDENHAIN GmbH, Traunreut (DE)

(72) Inventors: Simon Heinrich, Traunstein (DE); Christian von Le Suire, Chieming (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 15/090,630

(22) Filed: Apr. 5, 2016

(65) Prior Publication Data

US 2016/0315546 A1 Oct. 27, 2016

(30) Foreign Application Priority Data

Apr. 23, 2015 (DE) .................. 10 2015 207 454

(51) Int. Cl.
*H02M 1/36* (2007.01)
*H02M 3/335* (2006.01)
*H02M 1/00* (2006.01)

(52) U.S. Cl.
CPC ............ *H02M 1/36* (2013.01); *H02M 3/3353* (2013.01); *H02M 2001/0006* (2013.01)

(58) Field of Classification Search
CPC .............. H02M 1/36; H02M 3/3353; H02M 2001/0006; H02M 7/09; H02M 7/5387; H02M 7/48; H02M 1/32; H02M 7/53871; H02J 7/345

USPC ............... 363/16, 39, 21.07, 21.08, 49, 97; 320/166
See application file for complete search history.

(56) References Cited

U.S. PATENT DOCUMENTS 3,453,519 A * 7/1969 Hunter, Jr. ............ H02J 7/0078
320/152
4,460,969 A * 7/1984 Chen ....................... G06K 9/52
382/281

(Continued)

FOREIGN PATENT DOCUMENTS

CN 104410303 A 3/2015
DE 102008032316 A1 8/2009

(Continued)

OTHER PUBLICATIONS

Received search report from EIC 2800 STIC searcher Benjamin Martin dated Dec. 23, 2016.*

(Continued)

*Primary Examiner* — Timothy J Dole
*Assistant Examiner* — Htet Z Kyaw
(74) *Attorney, Agent, or Firm* — Leydig, Voit & Mayer, Ltd.

(57) ABSTRACT

A switched-mode power supply for supplying an operating voltage to a frequency converter includes a supply capacitor configured to supply the operating voltage to a control device for generating control signals for semiconductor switches of the switched-mode power supply. The supply capacitor is chargeable through a start-up circuit from a DC link of the frequency converter. The start-up circuit includes a current regulator that is configured to control a total current from the DC link to the start-up circuit.

7 Claims, 3 Drawing Sheets

(56) References Cited

U.S. PATENT DOCUMENTS

| | | | | |
|---|---|---|---|---|
| 5,452,195 A * | 9/1995 | Lehr | ...................... | H02M 1/36 323/901 |
| 6,456,511 B1 * | 9/2002 | Wong | ...................... | H02M 1/36 363/21.13 |
| 6,757,183 B2 * | 6/2004 | Feldtkeller | .............. | H02M 1/36 363/21.1 |
| 7,136,292 B1 * | 11/2006 | Chan | ...................... | H02M 1/36 363/21.09 |
| 7,433,210 B2 * | 10/2008 | Meitzner | ........... | H02M 3/33523 363/21.12 |
| 8,629,631 B1 | 1/2014 | Rhodes et al. | | |
| 9,048,747 B2 * | 6/2015 | Ansari | ...................... | G05F 1/10 |
| 9,241,380 B2 * | 1/2016 | Siessegger | ......... | H05B 33/0818 |
| 9,337,720 B2 * | 5/2016 | Jutras | ...................... | H02M 1/36 |
| 2002/0135433 A1 * | 9/2002 | Uchiyama | ................ | H03B 5/06 331/158 |
| 2008/0192516 A1 * | 8/2008 | Morbe | .................. | H02M 7/125 363/49 |
| 2010/0315024 A1 * | 12/2010 | Najima | ............. | H02M 7/53871 318/139 |
| 2011/0141775 A1 * | 6/2011 | Wang | ...................... | H02M 1/36 363/49 |
| 2011/0234123 A1 * | 9/2011 | Myers | ................ | H05B 33/0815 315/307 |
| 2011/0234184 A1 | 9/2011 | Hong et al. | | |
| 2012/0230069 A1 * | 9/2012 | Tzeng | .................... | H02M 1/36 363/49 |
| 2013/0094247 A1 * | 4/2013 | Kleinpenning | ......... | H02M 3/24 363/16 |
| 2013/0258737 A1 * | 10/2013 | Schoenlinner | .... | H02M 7/53871 363/132 |
| 2013/0285628 A1 * | 10/2013 | Giannopoulos | ......... | H02M 1/36 323/273 |
| 2014/0300274 A1 * | 10/2014 | Acatrinei | ........... | H05B 33/0815 315/85 |
| 2015/0257223 A1 * | 9/2015 | Siessegger | ......... | H05B 33/0818 315/186 |
| 2016/0156171 A1 | 6/2016 | Xiao et al. | | |

FOREIGN PATENT DOCUMENTS

| | | |
|---|---|---|
| EP | 0494327 B1 | 7/1992 |
| EP | 2264884 A2 | 12/2010 |
| JP | H 01110060 A | 4/1989 |

OTHER PUBLICATIONS

Espacenet Translated version of Nishijima Shinsuke foreign patent JPH 01110060 A, Apr. 26, 1989.*

G. Kácsor, et al., "Principles of Operation of Three-level Phase Shift Controlled Converter", Electronics and Electrical Engineering, No. 2(82), Dec. 2008, pp. 69-74.

* cited by examiner

SWITCHED-MODE POWER SUPPLY FOR POWERING A FREQUENCY CONVERTER

CROSS-REFERENCE TO PRIOR APPLICATION

Priority is claimed to German Patent Application No. DE 10 2015 207 454.4, filed on Apr. 23, 2015, the entire disclosure of which is hereby incorporated by reference herein.

FIELD

The present invention relates a switched-mode power supply for powering a frequency converter, in particular a start-up circuit for such a switched-mode power supply. Such start-up circuits serve to allow a switched-mode power supply that is used to supply an operating voltage of, for example, 24V to a frequency converter to be started up after the frequency converter is switched on. Like the frequency converter, the switched-mode power supply requires an operating voltage that is lower than the line voltage to be able to operate a control device used for driving semiconductor switching elements. This operating voltage must be maintained also after start-up in all operating conditions of the frequency converter and the switched-mode power supply.

BACKGROUND

Frequency converters are used, for example, to supply an AC current for driving electric motors. For this purpose, AC voltage of constant frequency of a multi-phase power supply system is converted by a rectifier to a DC voltage for charging a DC link capacitor. The DC voltage of this DC link is then converted by an inverter to an AC voltage of desired frequency and phase to suitably drive an electric motor. The frequency converter of an electric motor draws energy from the supply grid. This energy is ultimately supplied to the electric motor, where it is converted into kinetic energy.

To operate the frequency converter, a supply voltage of, for example, 24V is needed which is supplied to the control device for driving the semiconductor switches of the frequency converter through pulse-width modulation (PWM). Typically, this supply voltage is also taken from the DC link of the frequency converter by means of a switched-mode power supply.

Switched-mode power supplies are configured similarly to a frequency converter, and initially rectify the line voltage in order to charge a DC link. Using semiconductor switches, this DC voltage is converted to an AC voltage whose frequency is significantly higher (15-300 kHz) than that of the line voltage (50-60 Hz). It is this higher-frequency AC voltage that is fed to a transformer which provides at its output a suitable voltage that, after being rectified, is then available for operating the frequency converter.

The advantage of switched-mode power supplies is that the transformation of AC voltage occurs with much higher efficiency at higher frequencies. Unlike conventional power supplies, there is no need for a heavy iron core.

Switched-mode power supplies configured according to the known three-level phase shift topology (see, for example, G. Kácsor, P. Špánik, J. Dudrík, M. Luft, E. Szychta, Principles of Operation of Three-level Phase Shift controlled Converter, Electronics and Electrical Engineering, 2008. No. 2(82)) have four semiconductor switching elements for clocked application of a DC voltage obtained from an AC line voltage to a primary winding of a transformer.

However, like the frequency converter, the switched-mode power supply must be supplied with power to be able to drive the semiconductor switching elements thereof. Immediately after the frequency converter is switched on, the switched-mode power supply is unable to deliver a voltage because it cannot yet operate its semiconductor switches.

European Patent EP 0494327 B1 describes a start-up circuit which, after the switched-mode power supply is turned on, provides a supply voltage for the switched-mode power supply to start it up. The start-up circuit has a capacitive device and a resistive device interconnected to one another. The capacitive device is charged through the resistive device from a rectified AC line voltage until a control device can be powered from the voltage across the capacitive device.

German Patent Application DE 102008032316 A1 describes a start-up circuit for supplying power to control electronics of a frequency converter, where a capacitor is charged through a resistor from the DC link. After a certain time, a voltage sufficient to start up a PWM control device is then present across the capacitor. Once the switched-mode power supply has started to operate, the control device is powered via a self-supply winding of the switched-mode power supply. This document also addresses the problem that the start-up threshold of such circuits is not precisely defined because of manufacturing tolerances of conventional PWM control devices and the associated variance in the leakage current. In that document, this problem is remedied by using an additional switching element that ensures a defined switching hysteresis according to the applied input voltage.

When operating frequency converters with greatly varying power requirements, as is the case, for example, when using them in multi-axis machine tools, or in the case of a fluctuating line voltage, it is important that the switched-mode power supply be able to provide, under all operating conditions, a sufficient supply voltage for powering the frequency converter. In conventional frequency converters, this is not always guaranteed when high power is suddenly drawn from the common DC link of the frequency converter and the switched-mode power supply.

SUMMARY

In an embodiment, the present invention provides a switched-mode power supply for supplying an operating voltage to a frequency converter. The switched-mode power supply includes a supply capacitor configured to supply the operating voltage to a control device for generating control signals for semiconductor switches of the switched-mode power supply. The supply capacitor is chargeable through a start-up circuit from a DC link of the frequency converter. The start-up circuit includes a current regulator that is configured to control a total current from the DC link to the start-up circuit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an improved switched-mode power supply of a frequency converter. The aim is to ensure a defined behavior during start-up of the switched-mode power supply and thus of the frequency converter in spite of considerable production variance in terms of the power consumption of a control circuit of the switched-mode power supply.

In an embodiment, the invention provides a switched-mode power supply for supplying an operating voltage to a frequency converter, the switched-mode power supply having a supply capacitor that supplies voltage to a control device for generating control signals for semiconductor switches of the switched-mode power supply. To this end, the supply capacitor is charged through a start-up circuit from a DC link of the frequency converter. The start-up circuit includes a current regulator capable of controlling a total current from the DC link to the start-up circuit.

The current regulator maintains the total current constant. To this end, a valve of the current regulator that controls the total current acts only on a first partial current which, together with a second partial current, makes up the total current. The second partial current includes a leakage current of the control device and a charging current of the supply capacitor.

Thus, the current regulator ensures that the switched-mode power supply will always turn on at the same value of the rectified line voltage. This turn-on threshold is now at a defined DC link voltage and is independent of the leakage current of the control device. If the leakage current of the control device is large, the current through the current regulator connected in parallel to the control device and the gate drivers becomes small, and vice versa. Thus, the voltage value required of the supply capacitor of the control device to start the switched-mode power supply is in each instance reached at the same value of the rectified input line voltage or DC line voltage.

In addition, the control device and the gate drivers for driving the semiconductor switches are connected to the upper and lower potentials of the rectified line voltage of the DC link through two high-resistance resistor chains. Thus, the reference potential of the control device and the gate drivers is at the mid-potential of the two DC link capacitors that are connected through a charging resistor to the bridge rectifier, and yet is reliably isolated from the line voltage by the protective impedance of the resistor chains. Thus, one the one hand, start-up of the switched-mode power supply is also ensured when the input is connected to an isolating transformer that is not grounded at the star point and, on the other hand, the control device can be connected through a diode to the output capacitors of the switched-mode power supply during operation. This makes it possible to ensure operation of the switched-mode power supply under all conditions.

Figure 1:
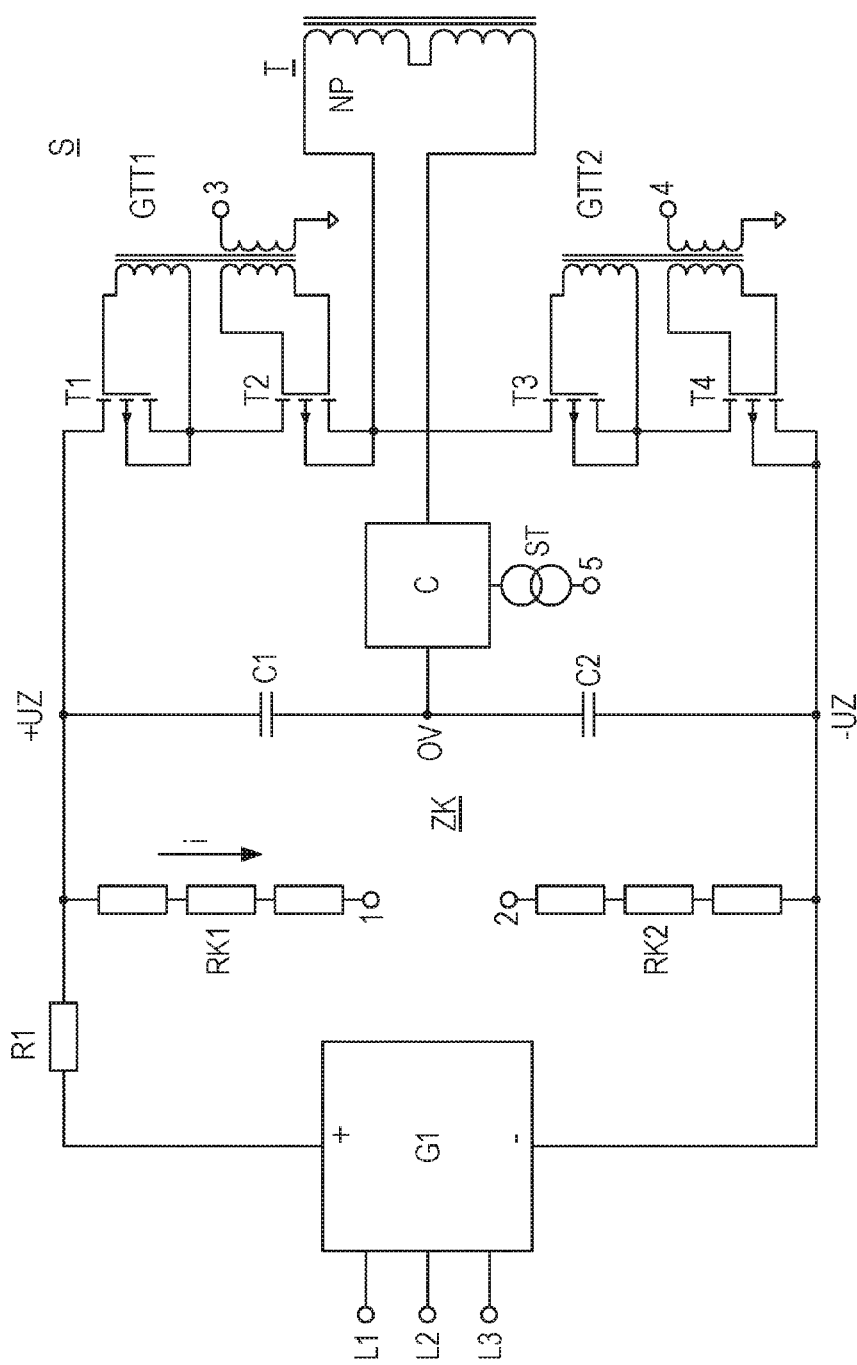
FIG. 1 shows the primary portion of a switched-mode power supply.

FIG. 1 shows the primary portion of a switched-mode power supply S having a three-level phase shift topology. The three phases L1, L2, L3 of a supply grid are supplied via an isolating transformer and rectified in a first rectifier G1. A DC link ZK made up of two capacitors C1, C2 connect in series between the positive and negative potentials +UZ, −UZ of the DC voltage is charged through a resistor R1. DC link capacitors C1, C2, each having a capacitance of 690 µF, smooth the DC voltage produced by rectifier G1 and provide a mid-potential of 0V between the upper and lower potentials +UZ, −UZ of the DC voltage. If the line-to-line voltage between the three line phases L1, L2, L3 is, for example, 400V, then the potential difference after rectification is about 560V. Thus, the upper and lower potentials of DC link ZK are at +280V, respectively −280V, relative to the mid-potential of 0V.

A first terminal of a primary winding NP of transformer T is alternately connected to the positive and negative potentials +UZ, −UZ of DC link ZK via two series-connected T1, T2, respectively T3, T4, so that a square-wave voltage alternating between −280V and 280V is present at this input. The second terminal of primary winding NP is connected to the mid-potential 0V between the two DC link capacitors C1, C2. The current flowing in primary winding NP is measured by a current-measuring unit C, and the value thereof is provided through a current-measuring transformer ST to subsequent electronics (via terminal 5, see also FIG. 2).

Semiconductor switches T1, T2, T3, T4 are driven by gate driver transformers GTT1, GTT2. In this manner, the semiconductor switching elements T1, T2, T3, T4, to which high voltages are applied, are galvanically isolated from the driver circuit that is disposed on the secondary side and provides the pulse-width modulated signals (PWM signals) for driving them (via terminals 3 and 4).

A touch-safe voltage is provided for the start-up circuit of the switched-mode power supply disposed on the secondary side via two high-resistance resistor chains RK1, RK2 connected to the upper and lower potentials +UZ, −UZ of DC link ZK. Each of high-resistance resistor chains RK1, RK2 has a total resistance of 450 k, so that the 3.5 mA current maximally allowed for a touch-safe voltage is not exceeded. Because this total resistance is distributed between a plurality of individual resistors in each of resistor chains RK1, RK2, this holds even when one of the individual resistors is defect and becomes low ohmic, for example.

Figure 2:
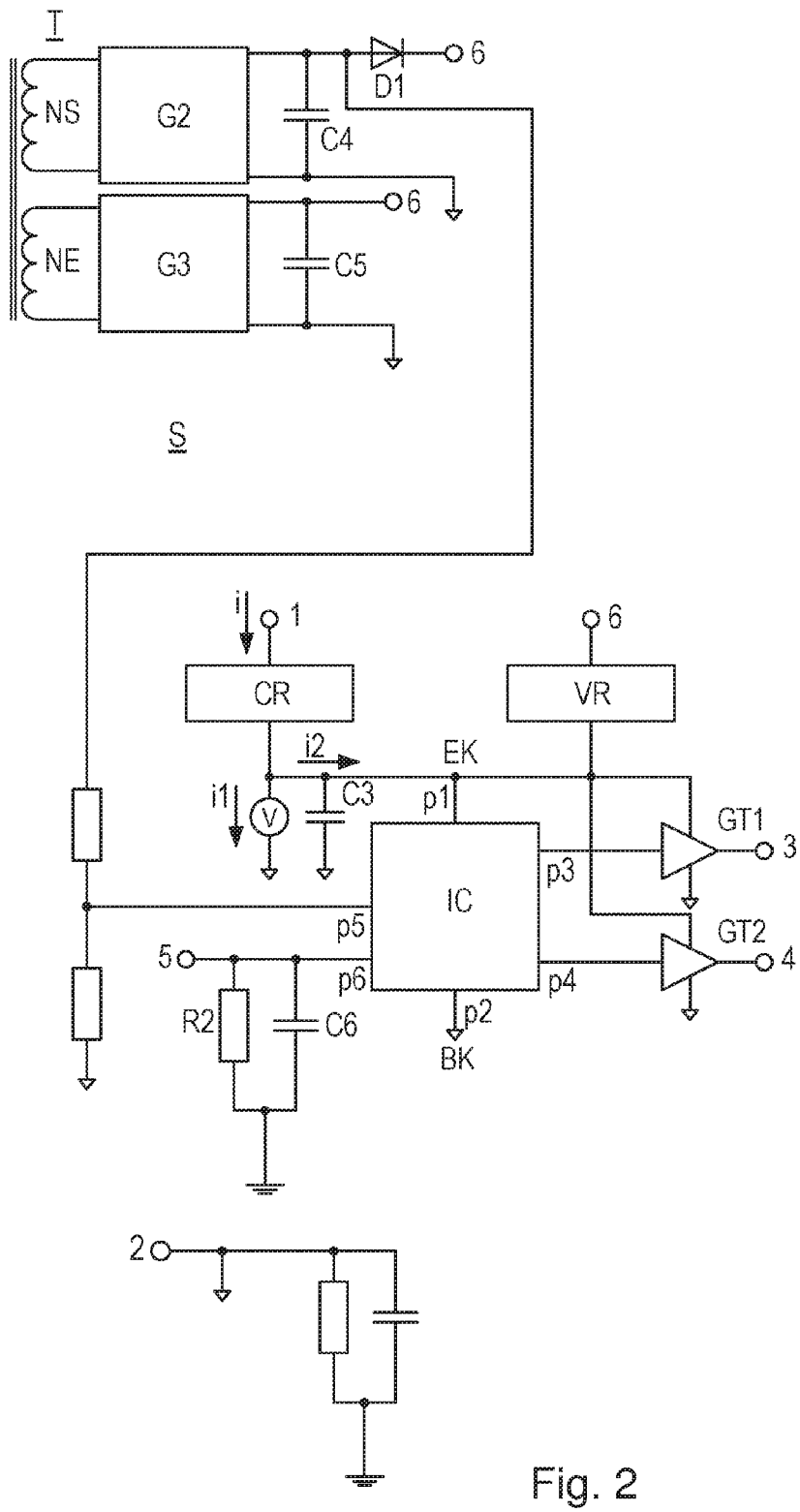
FIG. 2 shows the secondary portion of the switched-mode power supply.

The secondary portion of the switched-mode power supply is shown in FIG. 2, which should be considered in conjunction with FIG. 1. The two subcircuits are electrically interconnected at the terminals denoted by numerals 1 through 5. There are shown a secondary winding NS which is disposed opposite primary winding NP, so that, after rectification by a second rectifier G2, secondary winding NS supplies the DC voltage of, for example, 24V that is required for operating a frequency converter. This DC voltage is smoothed and buffered by a first buffer capacitor C4.

A self-supply winding NE used for powering switched-mode power supply S during operation is also disposed opposite primary winding NP.

A control device IC is used for controlling two gate drivers GT1 and GT2, which are used to drive the two gate driver transformers GTT1 and GTT2, and thus ultimately semiconductor switches T1, T2, T3, T4. Control device IC is designed as an integrated circuit and produces the square wave signals required for driving semiconductor switches T1, T2, T3, T4 by pulse-width modulation.

Control device IC has the following terminal pins: the supply voltage for the control device is applied to pin p1, and the reference potential is applied to pin p2. Typically, such control devices IC turn on as soon as a voltage of 12V is present between input terminal EK and reference potential terminal BK.

Pins p3 and p4 are used for driving gate drivers GT1, GT2. Pin p5 is used for measuring the output voltage of switched-mode power supply S, which is tapped by a voltage divider from the output of switched-mode power supply S. Finally, the measured value of the current in primary coil NP is applied to pin p6.

Once supplied with sufficient voltage through terminals p1, p2, control device IC computes suitable control signals (PWM patterns) for gate drivers GT1, GT2 based on the information about the output voltage of switched-mode power supply S and the current in primary coil NP.

Before this control device IC and gate drivers GT1, GT2 are able to operate, these elements must be supplied with the required supply voltage by a start-up circuit. To this end, they each have an input terminal EK for receiving the supply voltage and a reference potential terminal BK for a reference potential, also symbolized by triangle in the figures.

A supply capacitor C3 having a capacitance of 230 µF is a central element of the start-up circuit. This capacitor C3 is connected between input terminal EK and reference potential terminal BK. Thus, the voltage across the supply capacitor C3 corresponds to the supply voltage available to control device IC and gate drivers GT1, GT2.

The start-up circuit charges supply capacitor C3 from DC link ZK. To this end, upper potential +UZ of DC link ZK is connected to input terminal EK through first high-resistance resistor chain RK1, a current regulator CR also being disposed in the supply line. Reference potential terminal BK is connected to lower potential −UZ of DC link ZK through second high-resistance resistor chain RK2. Thus, the reference potential of control device IC and gate drivers GT1, GT2 is at the mid-potential 0 V of the two DC link capacitors C1, C2 that are connected through charging resistor R1 to bridge rectifier G1, and yet is reliably-isolated from the line voltage by the protective impedance of resistor chains RK1, RK2.

Total current i flowing through first high-resistance resistor chain RK1 to the start-up circuit is adjusted by current regulator CR to a fixed value. This total current i is split into a first partial current i1 and a second partial current i2. Valve V, which is located in the path of first partial current i1, is controlled by current regulator CR to maintain total current i constant, while second partial current i2, on the one hand, charges supply capacitor C3 and, on the other hand, also includes the leakage current to control device IC. Without these special measures in the start-up circuit, the considerable variance in this leakage current would result in that two switched-mode power supplies of identical design would behave very differently during start-up because the turn-on threshold would differ from unit to unit. Thanks to current regulator CR, which, regardless of this leakage current, maintains total current i, and thus the voltage drop across resistor chains RK1, RK2, constant (by controlling valve V, which adjusts first partial current i1 directly with respect to the reference potential), it is possible to achieve a defined turn-on threshold for all switched-mode power supplies S. This eliminates the effects of the production-related variance in the leakage current of control device IC. A specific exemplary embodiment of a current regulator CR and a valve V will be described further below.

In order for control device IC to be reliably supplied with sufficient energy at all times under all operating conditions after control device IC is started up by means of the start-up circuit, power supply to control device IC and gate drivers GT1, GT2 is now provided by the switched-mode power supply S itself, as will be described in more detail below.

When, after application of the line voltage in phases L1, L2, L3 of the supply grid, the voltage in DC link ZK reaches a value of 400V, then, after a certain time, the charge in capacitor C3, and thus the supply voltage present between input terminal EK and reference potential terminal BK, becomes sufficiently large to operate control device IC and gate drivers GT1, GT2. Now, semiconductor switches T1, T2, T3 and T4 can be driven through pulse-width modulation, and transformer T of switched-mode power supply S can be put into operation.

As soon as control device IC and gate drivers GT1, GT2 are able to start operating, transistors T1, T2, T3, T4 are clocked. Now, an AC voltage is induced both in secondary winding NS and in self-supply winding NE.

The AC voltage of secondary winding NP is rectified by a second rectifier G2. The DC voltage so produced is smoothed by first buffer capacitor C4 and fed through a diode D1 to a voltage regulator VR. This voltage regulator VR delivers the voltage required for operating control device IC and gate drivers GT1, GT2 to input terminal EK.

The AC voltage of self-supply winding NE is rectified by a third rectifier G3. The DC voltage so produced is smoothed by a second buffer capacitor C5 and also fed to voltage regulator VR so as to provide a supply voltage sufficient to operate control device IC even before the voltage at first buffer capacitor C4 becomes sufficient for this purpose.

The capacitance value of the buffer capacitor C5 is 2 µF, while the capacitance value of buffer capacitor C4 is 10 mF and thus more than three orders of magnitude higher. For this reason, the voltage at buffer capacitor C5 rises significantly faster than at buffer capacitor C4. Thus, after initial start-up of switched-mode power supply S, power supply to control circuit IC and gate drivers GT2, GT2 is ensured very quickly by buffer capacitor C5 and downstream voltage regulator VR, even before the voltage at buffer capacitor C4 is sufficient to ensure power supply to control device IC and gate drivers GT1, GT2. During this period after start-up of the circuit, diode D1 isolates the two buffer capacitors C4 and C5 from each other.

The power required for control device IC and gate drivers GT1, GT2 to operate switched-mode power supply S is about 2 watts. If the output current of switched-mode power supply S is abruptly reduced, this causes control device IC to reduce the pulse width in primary winding NP of transformer T so as to maintain constant the output voltage at C4 and thus also the voltage at pin 5 of control device IC. Pin 5 of control device IC is an inverting input of an operational amplifier configured as a PID controller, which is used for regulating the output voltage of switched-mode power supply S. Due to the greatly differing capacitance values of C4 and C5, the reduced pulse width results in that the voltage at C5 is no longer sufficient to maintain the supply voltage. In this case, power supply to control device IC and gate drivers GT1, GT2 is ensured via buffer capacitor C4, diode D1 and voltage regulator VR.

Thus, after start-up with the aid of the start-up circuit, control device IC is initially powered from supply capacitor C3, respectively from self-supply winding NE and thus from second buffer capacitor C5. As soon as secondary winding NS has completely charged the significantly larger second buffer capacitor C4, the output voltage thereof is also provided via D1 to voltage regulator VR. This ensures, on the one hand, rapid self-powering of switched-mode power supply S and, on the other hand, stable buffering during operating conditions in which transformer T is unable to deliver sufficient energy, for example, because of a brief drop in the DC link voltage. This may be caused by a particularly high energy demand of the motors connected to the frequency converter, for example, when several axes need to be strongly accelerated at the same time.

If current-measuring unit C detects an overcurrent event, which may be caused, for example, by a short circuit or an overload on the 24V secondary side of transformer T, control device IC turns off the control signals of the four semiconductor switches T1, T2, T3, T4. Common mode filter R2, C6 (R2=688 k, C6=100 pF) filters out the interference that is caused by the fact that the mid-potential 0V of capacitors C1 and C2 and the reference potential of control device IC and gate drivers GT1, GT2 are reliably isolated. Without common mode filter R2, C6, control device IC would detect an overcurrent event via terminal pin p6 when switched-mode power supply S is operated with three-level phase shift topology and low output load. As a result, switched-mode power supply S would be switched off, and thus operation in steady state would not be possible.

In the following, an exemplary embodiment for a start-up circuit will be described in more detail with reference to FIG. 3. There are shown DC link ZK including the two capacitors C1 and C2 thereof, as well as the two resistor chains RK1 and RK2 through which total current i flows into the start-up circuit. Also shown is capacitor C3, which is connected at one terminal to input terminal EK and at the other terminal to reference potential terminal BK.

When a voltage of 400V is present in DC link ZK, a total current i of 440 μA flows through resistor chains RK1, RK2 into the start-up circuit. This total current i also flows through resistors R9 and R10. The current-dependent voltage drop across these resistors R9 and R10 is measured by bipolar transistor PNP and maintained constant by varying the voltage at the collector of bipolar transistor PNP. This is because if the current through R9 and R10 becomes smaller, the voltage at the collector of bipolar transistor PNP decreases. The bipolar transistor that acts as the valve V then becomes more conductive, and the current through resistors R9, R10 and R12 increases again.

It is important in this context that the total current i flowing from DC link ZK through resistor chain RK1 to the start-up circuit be measured as a whole and maintained constant through regulation, while the valve V controlled for regulation only controls first partial current i1, which does not flow to control device IC. Second partial current i2, which flows to control device IC, includes not only the charging current for supply capacitor C3, but also the leakage current of this control device IC, which may vary greatly due to production variance. The sum of the two partial currents i1 and i2 just makes up total current i. The current flowing through R11, R13 and R14 is negligibly small. The resistance values of the circuit of FIG. 3 are: R9=464 k; R10=316 r; R11=100 k; R12=464 k; R13=464 k and finally R14=464 k.

Figure 3:
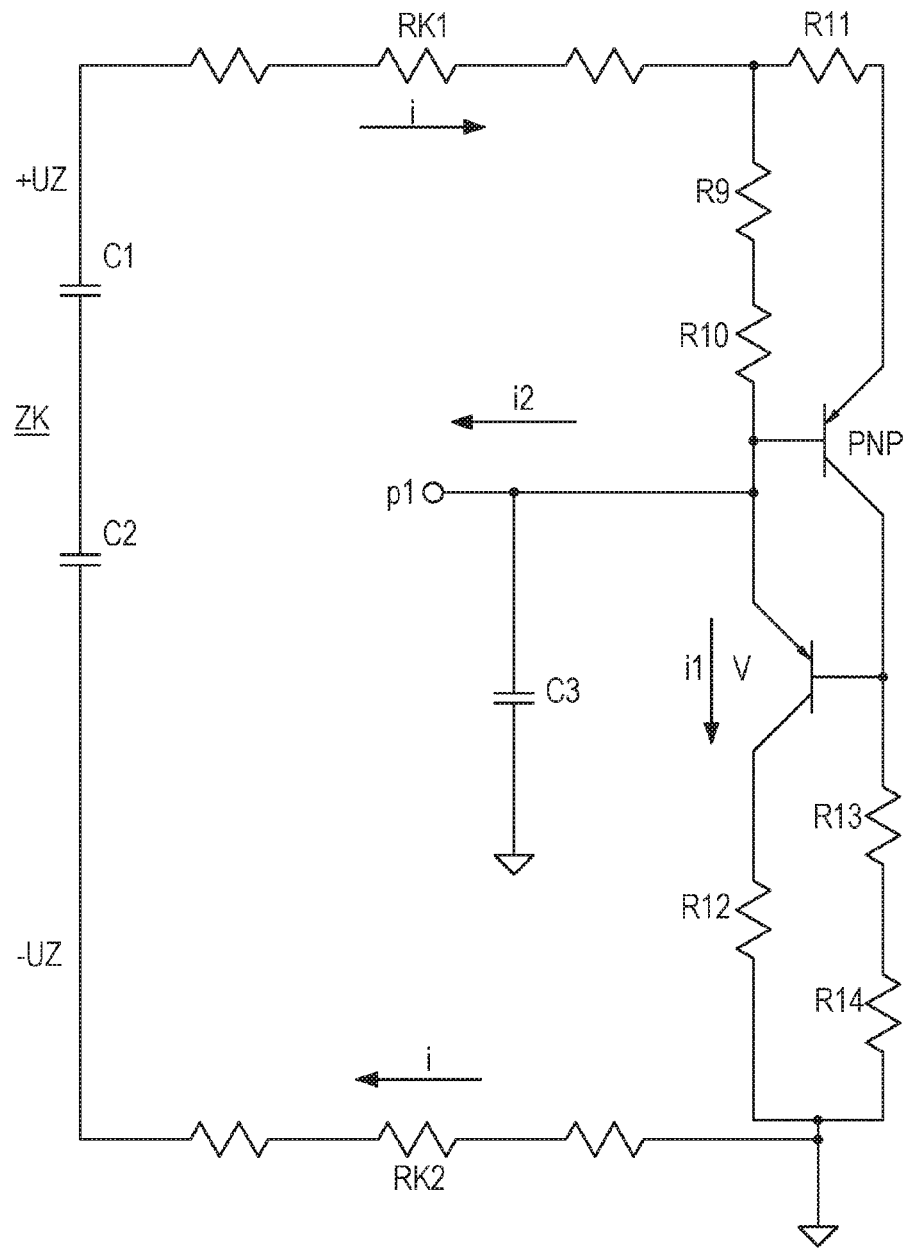
FIG. 3 shows a start-up circuit for the switched-mode power supply.

The circuit of FIG. 3 is designed such at a DC link voltage of 400V during turning-on of the control device, a first partial current i1 having a value between 190 μA and 290 μA flows through resistor R12. The leakage current, i.e., second partial current i2, of control device IC may be between 250 μA and 150 μA due to production variance. However, thanks to current regulator CR, the summed current (total current i) of the two partial currents i1, i2 is constant at 440 μA. Using this current regulator CR, whose valve V acts only on a first partial current i1 of the measured total current i, it is achieved that the voltage at capacitor C3 will always reach the value above 12V that is required for the start-up of switched-mode power supply S, regardless of leakage current i2 of control device IC, and within a very narrow range of DC link voltage ZK. This eliminates the negative effects of the production variance in the leakage current of control device IC.

In summary, thanks to the special start-up circuit, a defined turn-on point is achieved for switched-mode power supply S, regardless of the leakage current of the control circuit IC installed in the particular unit. In addition, after start-up, the special, redundant supply of power to switched-mode power supply S quickly provides a reliable power supply that is stable under all operating conditions While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switched-mode power supply for supplying an operating voltage to a frequency-converter, the switched-mode power supply comprising:
   a supply capacitor configured to supply the operating voltage to a control device for generating control signals for semiconductor switches of the switched-mode power supply; and
   a start-up circuit from a DC link of the frequency converter by which the supply capacitor is chargeable, the start-up circuit including a current regulator that is configured to maintain a constant total current from the DC link to the start-up circuit, wherein a valve of the current regulator that controls the total current is configured to act only on a first partial current which, together with a second partial current, makes up the total current, the second partial current including a leakage current of the control device and a charging current of the supply capacitor, wherein none of the first partial current acted on by the valve flows to the control device.

2. The switched-mode power supply as recited in claim 1, further comprising two DC link capacitors connected in series in the DC link and configured to provide a mid-potential between an upper and a lower potential of the DC link, the supply capacitor having two terminals and being connected, at each of the two terminals, to a respective one of the upper and lower potentials of the DC link through a respective high-resistance resistor chain so that the start-up circuit and the control device are at the mid-potential.

3. The switched-mode power supply as recited in claim 2, wherein the control device is galvanically isolated from the semiconductor switches by gate driver transformers.

4. The switched-mode power supply as recited in claim 2, wherein a first terminal of a primary winding is connected to the mid-potential, and a second terminal of the primary winding is switchable between the upper and lower potentials of the DC link by means of the semiconductor switches.

5. The switched-mode power supply as recited in claim 1, further comprising, on a secondary side, a secondary winding and a self-supply winding whose rectified output voltages are buffered by a respective first and second buffer capacitor and fed to a voltage regulator which allows the control device to be supplied with the operating voltage during operation of the switched-mode power supply.

6. The switched-mode power supply as recited in claim 5, wherein the first buffer capacitor of the secondary winding has a capacitance that is a factor of at least 1,000 higher than that of the second buffer capacitor of the self-supply winding.

7. The switched-mode power supply as recited in claim 6, wherein the first buffer capacitor is isolated by a diode from the second buffer capacitor.

\* \* \* \* \*